US008599237B2

(12) United States Patent
Moore et al.

(10) Patent No.: US 8,599,237 B2
(45) Date of Patent: *Dec. 3, 2013

(54) MULTIPLE VIDEO STREAM CAPABILITY NEGOTIATION

(75) Inventors: Timothy M. Moore, Bellevue, WA (US); Jingyu Qiu, Bellevue, WA (US); Regis J. Crinon, Camas, WA (US); Shiwei Wang, Bellevue, WA (US); Humayun Mukhtar Khan, Redmond, WA (US); Ling Niu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,346

(22) Filed: Mar. 26, 2012

(65) Prior Publication Data

US 2012/0176469 A1    Jul. 12, 2012

Related U.S. Application Data

(63) Continuation of application No. 12/049,112, filed on Mar. 14, 2008, now Pat. No. 8,144,187.

(51) Int. Cl.
    *H04N 7/14*    (2006.01)
(52) U.S. Cl.
    CPC ........................................ *H04N 7/14* (2013.01)
    USPC ................................... 348/14.12; 348/14.09
(58) Field of Classification Search
    USPC .......... 348/14.01, 14.07, 14.08, 14.09, 14.12; 370/260, 261; 709/204; 379/202.01
    See application file for complete search history.

(56) References Cited

U.S. PATENT DOCUMENTS

| 5,774,674 | A  | 6/1998  | Gutmann et al. ........ 395/200.67 |
| 6,594,699 | B1 | 7/2003  | Sahai et al. .................... 709/228 |
| 7,034,860 | B2 | 4/2006  | Lia et al. ..................... 348/14.09 |
| 7,043,528 | B2 | 5/2006  | Schmitt et al. ................ 709/204 |
| 7,627,629 | B1 | 12/2009 | Wu et al. ......................... 709/204 |
| 8,144,187 | B2 | 3/2012  | Moore et al. |
| 2003/0135863 | A1 | 7/2003 | Van Der Schaar .............. 725/95 |
| 2005/0157660 | A1 | 7/2005 | Mandato et al. .............. 370/254 |
| 2006/0087553 | A1 | 4/2006 | Kenoyer et al. ............ 348/14.08 |
| 2007/0024705 | A1 | 2/2007 | Richter et al. ................ 348/142 |
| 2007/0186002 | A1 | 8/2007 | Campbell et al. ............. 709/231 |
| 2007/0220162 | A1 | 9/2007 | Levin et al. .................... 709/231 |
| 2007/0285500 | A1 | 12/2007 | Ma et al. .................... 348/14.07 |
| 2008/0055399 | A1 | 3/2008 | Woodworth et al. ...... 348/14.12 |

OTHER PUBLICATIONS

Adaptive High-quality Video Service for Network-based Multi-party Collaboration http://netmedia.gist.ac.kr/agdv/Document/ITCOM2005.pdf.
Requirements for Session Description and Capability Negotiation http://www-rn.informatik.uni-bremen.de/ietf/mmusic/sdp-ng/drafts/draft-ietf-mmusic-sdpng-req-01.html.
SurfStream Media Server Framework for Development of Advanced Cross-Network Server Applications http://www.ctipro.cz/download/SurfStream-Brochure.pdf.
QoS Estimation during Session Initiation of Video Streaming Session http://publik.tuwien.ac.at/files/pub-et_12486.pdf.

*Primary Examiner* — Tuan D Nguyen
(74) *Attorney, Agent, or Firm* — Merchant & Gould

(57) ABSTRACT

Video send and receive capabilities of participants are determined by the respective machines determining available combinations, as well as preferences for the receivers. Receiver capabilities are forwarded to the source for computation of negotiated video capabilities through a logic intersection of the determined capabilities based on desired number of streams and resolutions. If a resolution of a send capability exists within the receive capability, the highest frame and/or bit rate may be selected for transmission.

20 Claims, 9 Drawing Sheets

MULTIPLE VIDEO STREAM CAPABILITY NEGOTIATION

RELATED APPLICATIONS

The present application is a continuation of U.S. application Ser. No. 12/049,112, filed Mar. 14, 2008, and titled Multiple Video Stream Capability Negotiation.

BACKGROUND

Videoconferencing uses telecommunications of audio and video to bring people at different sites together for a meeting. This can be as simple as a conversation between two people in private offices (point-to-point) or involve several sites (multipoint) with more than one person in a number of rooms at different sites. Besides the audio and visual transmission of people, videoconferencing can be used to share documents, computer-displayed information, and whiteboards.

Videoconferencing among multiple remote points is sometimes facilitated employing Multipoint Control Unit (MCU) for routing Audio and Video streams, sometimes also called an Audio/Video MCU (AVMCU). An MCU is a bridge that interconnects calls from several sources. All parties call the MCU, or the MCU may call the parties which are going to participate, for initiating the conference. MCUs may use various protocols such as Internet Protocol (IP), and be structured as software program(s), hardware, or combination of the two. One of the main tasks for an MCU is to organize the conference based on capabilities of the participating parties (e.g. receiving parties and source in a single source directed conference).

In video conferencing, users may desire to see multiple meeting participants at same time. A typical video conference solution transcodes and reconstructs a multi-person view on the AVMCU into one video stream. Another approach is to forwarding multiple streams from different senders to one user. Former case is simple but not scalable. Latter case scales better, but is more complex.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to accommodating transmission of multiple video streams with varying resolutions to different recipients in a video conference through capability and preference discovery and negotiation. According to some embodiments, receivers may specify their video receive capabilities as well as their preferences based on their characteristics and attributes to a video source, which upon comparing those with its video send capabilities may determine negotiated video capabilities for transmission through a logic operation applied to the capabilities.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, multiple video streams may be provided to different recipients in a video conference through discovery and negotiation of capabilities and preferences. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While embodiments are described for video conference systems, they are not limited to strictly video conferencing. Network-based conferences combining various forms of communication such as audio, video, instant messaging, application sharing, and data sharing may be facilitated using the principles described herein.

Figure 1:
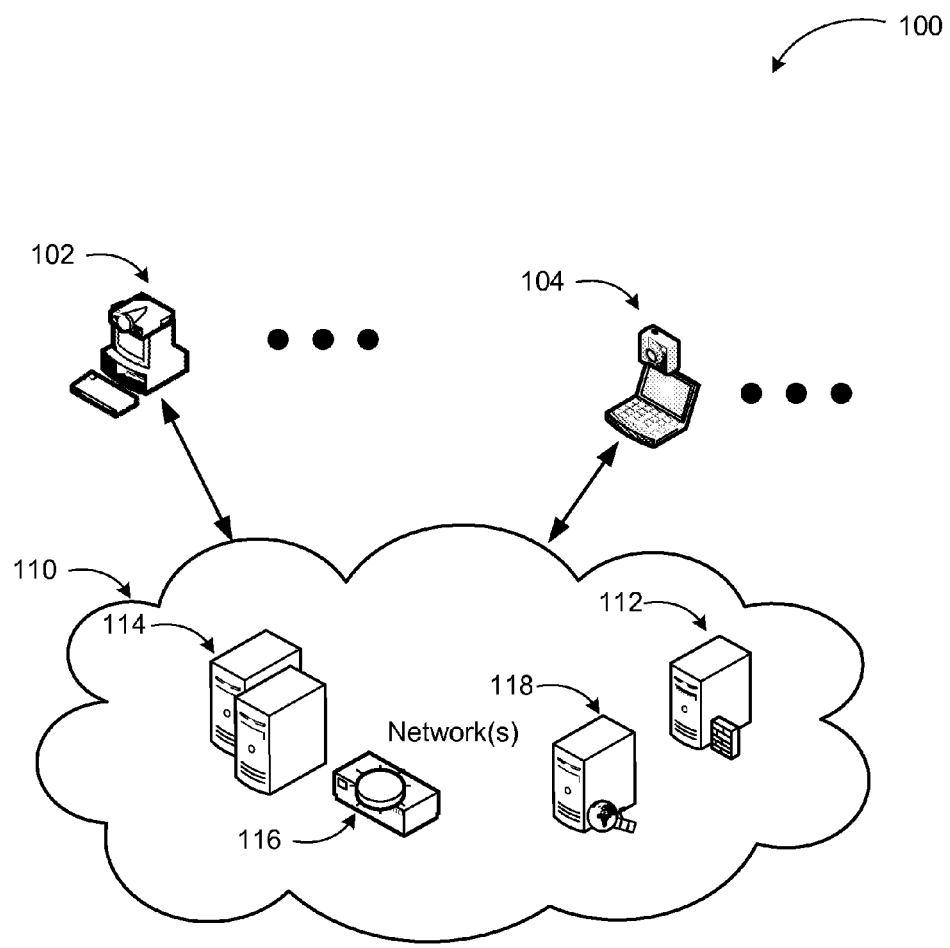
FIG. 1 is a diagram illustrating an example video conferencing system.

Referring to FIG. 1, diagram 100 of an example video conferencing system is illustrated. At the core of a video conferencing system is a network (e.g. network 110) enabling a number of participants (102, 104) with audio/video transmission and reception capability to communicate with each other as a group. Participant machines 102, 104 may be any computing device with audio/video capability such as desktop or laptop computers with a camera and microphone (as well as a speaker), specialized video conferencing equipment, or even mobile devices with audio/video capabilities.

Network 110, as discussed in more detail below, may be any communication network or combination of networks. The video conference may be facilitated by a single device/program or by a combination of devices and programs. For example, audio/video server 118, firewall server 112, or mediation servers 114 may be involved with different aspects of the conference such as storage and processing of audio/video files, security, or interconnection of various networks for seamless communication. Any of these example tasks and others may be performed by software programs, hardware devices, and/or combination of the two.

According to one embodiment, MCU 116 may be the main facilitator of the video conference in coordination with one or more of the other devices and/or programs mentioned. MCU 116 may use various protocols such as Internet Protocol (IP), and be structured as software program(s), hardware, or combination of the two. MCU 116 may be a stand-alone hardware device, or it may be embedded into dedicated conferencing devices (e.g. audio/video server 118 or mediation servers 114). Furthermore, MCU 116 may be structured as a "decentralized multipoint", where each station in a multipoint call exchanges video and audio directly with the other stations with no central manager or other bottleneck.

As mentioned previously, an MCU controlled video conference may support receiving one video stream with fix resolution or receiving multiple video streams with different resolutions. MCU 116 may support, in addition to regular video conferences, multi-party conferences that escalate from a peer-to-peer chat through a mesh network.

Participants in the video conference such as the end devices and the MCU may communicate also through Session Description Protocol (SDP), which is a format for describing streaming media initialization parameters. SDP is intended for describing multimedia sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats enabling systems based on this technology to be forward compatible.

To provide each participant with the ability to request multiple video sources and deliver the right streams, various factors have to be considered including: receiver's capabilities (e.g. PC or mobile device's processing power, downlink bandwidth to the client during the meeting, maximum display addressability), sender's capabilities (e.g. PC or mobile device's processing power, uplink bandwidth from the client during the meeting, webcam maximum resolution), viewer's preferences (e.g. number of sources to view, display size of each source), and infrastructure administration (e.g. the need to limit the bandwidth consumed by video conferences).

Video capabilities may be defined as resolution, frame rate, bit rate, number of streams, and the like. One example scenario is when multiple people request the same source to send different video resolutions. This becomes challenging especially when the number of requesters is large (e.g. in hundreds), since the requests have to be aggregated into a single request to the sender.

A number and combination of video stream combinations provided to recipients from a source through the MCU according to one embodiment may be determined through discovery of sender and recipient capabilities and recipient preferences. Then, a negotiated set of capabilities may be determined and the stream combinations made available to the recipients. The computation of the negotiated combinations may take place at the sender based on information forwarded by the MCU from the recipients or at the MCU.

Figure 2:
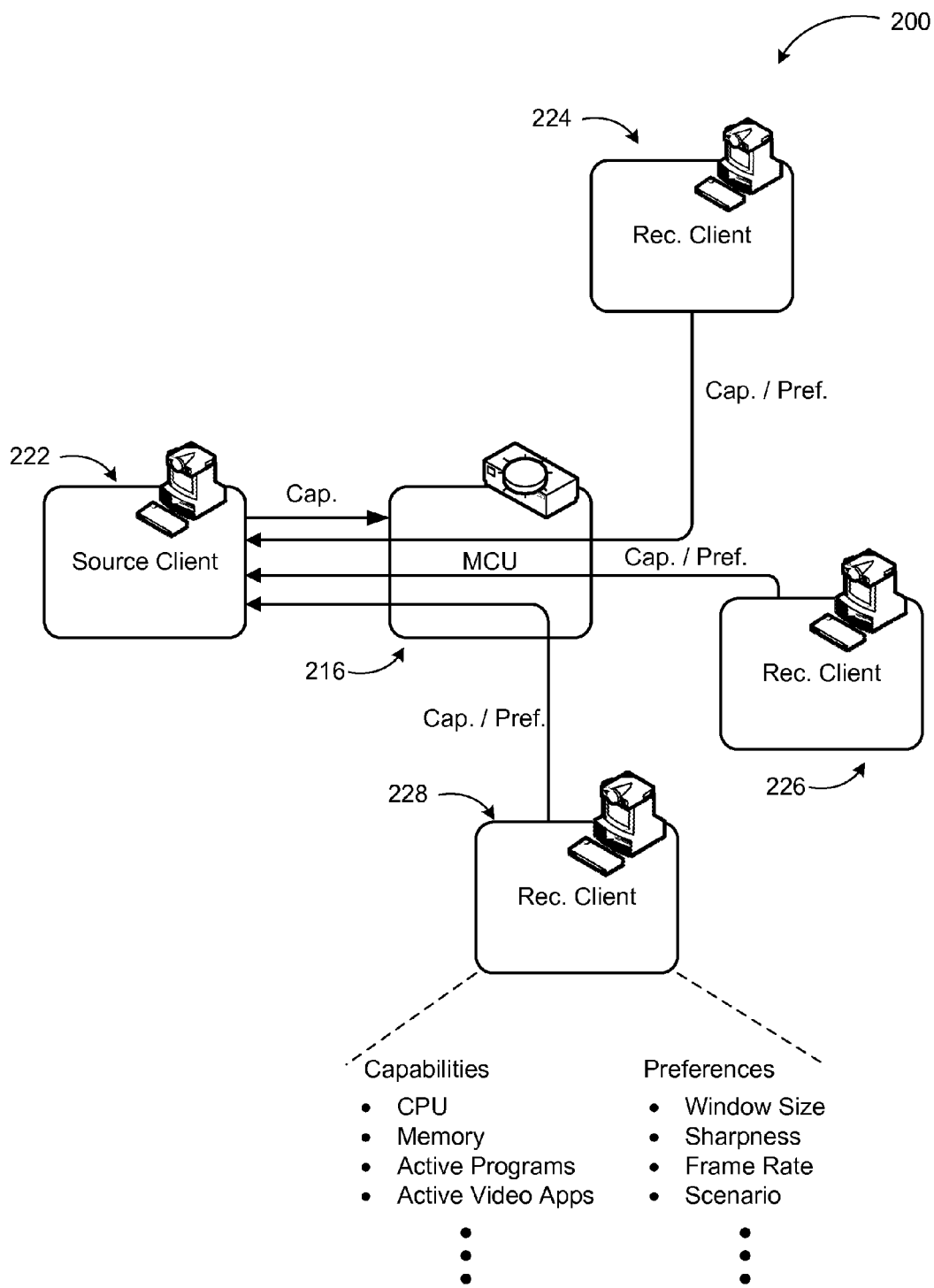
FIG. 2 is a conceptual diagram illustrating an MCU coordinating video conference with a source and multiple receiving participants exchanging capability and preference information.

FIG. 2 is a conceptual diagram illustrating an MCU coordinating video conference with a source and multiple receiving participants exchanging capability and preference information.

Video streams in a conference system according to embodiments may be defined based on their resolution and referred by video stream description. A video stream description describes a video stream by its stream type name, video resolution, maximum frame rate, and maximum allowed bit rate. Examples of resolutions that may be used in a system according to embodiments include, but are not limited to, High Definition (HD), Video Graphics Array (VGA), Common Intermediate Format (CIF), and Quarter CIF (QCIF). For example the video stream description of a stream according to VGA resolution may look like: VGA (640×480, 24, 800000), where the first term is the resolution (x and y axes), the second term is frames per second, and the third term is the bit rate per second.

A video stream combination according to embodiments describes a set of video streams that may be supported at the same time (with an AND relationship) by a video sender or a video receiver. The video stream combination may include a listing of the video stream descriptions of combined resolutions along with a number indicating how many of each resolution the sender or the receiver is capable of supporting.

A video send capability contains a set of video stream combinations that may be supported by the sender. According to one embodiment, these sets of combinations may be supported either or (an OR relationship), but not at same time. Thus, being able to send VGA does not necessarily imply capability to send lower resolution such as CIF or QCIF. Similarly, a video receive capability contains a set of video stream combinations that may be supported by the receiver. These sets of combinations may be supported either or (an OR relationship), but not at same time as in video send capability.

In the system shown in diagram 200, client device 222 in source role (source of video transmission) may determine its video send capability based on its physical and software attributes such as its processing power, memory size and available memory amount, currently active programs, video applications (each consuming processing and memory capacity), uplink bandwidth, encoding capabilities, and so on. Similarly, each of the receiving client devices 224, 226, and 228 may determine their video receive capabilities based on similar factors (except encoding capability). The capabilities may be defined as tables or parameters in a structured markup language (e.g. XML) and exchanged among end-points employing one of the protocols discussed above such as SDP.

While the capability tables may be static, they may also be dynamic (based on changing client device attributes. They may even be generated per attribute such as per CPU speed. Once the capabilities are determined the negotiated video capability may be determined This may be accomplished at the source client 222 by all receiving clients providing their receive capabilities to the source client through MCU 216 or at the MCU 216 by all clients (source and receiving) providing their capabilities to the MCU 216.

Negotiated video capability may be computed by video send capability of the source client and video receive capabilities of the receiving clients (including the receive capability of the sending endpoint) through a logic operation. According to one embodiment, the capabilities may be expressed as tables and the negotiated capability may be determined through an intersection of these tables. The intersection operation may be defined in different ways. One example approach is to produce the negotiated capability as representing the minimum of all the capabilities such that neither the sending endpoint or the receiving endpoints have any problems with processing the video media streams.

The negotiated video capability may be described in the same way as a video send capability. According to another embodiment, the negotiated video capability may consist of a set of video stream combinations such that for each video stream combination X in a negotiated video capability, there exists at least one combination A in sender capability and one combination B in receiver capability, such that $X \leq A$ AND $X \leq B$.

The $\leq$ operation may be defined in terms of comparing two video stream descriptions as $A \leq B$ if $X_A = X_B$ and $Y_A = Y_B$ and $FPS_A \leq FPS_B$ and $BR_A \leq BR_B$, where X and Y denote the addressability of the display along the horizontal and vertical axes, respectively, FPS is frame rate per second, and BR is bit rate per second.

According to further embodiments, the receiving client devices may also determine and specify preferred capabilities to the MCU or the source client. The preferred capabilities may be determined based on factors such as a display window size of the receiving client, desired sharpness of displayed image, desired frame rate, conference scenario (e.g. whether the main video source is a talking person or someone writing on a whiteboard, which may require higher resolution), and so on. While the receive capabilities are determined as a list of stream combinations, the receive preference may be defined one per stream, because they are related to how the stream should represent the media in terms of resolution, frames/sec and bit rate according to the receiving user's viewing preference. Receive preferences are dynamic in nature and May change in the course of a single Audio/Video conference session. They represent the instantaneous mode for media presentation selected in each of the receive end-points.

If a receiving user's preferred capability is lower than its video receive capability, the negotiated video capability may be determined using the preferred capability for that user. For obvious reasons, the preferred capability may not be higher than the receiving client's video receive capabilities. However, the user (or the receiving client automatically) may specify a preferred capability equal or lower than the video receive capability, but the negotiated capability may be even lower than that. In that case, the sender may ignore the preferred capability. For example, video receive capabilities for a receiving client may be VGA, CIF, and QCIF. Due to capabilities or other receiving clients and/or video send capabilities, the source client may determine the negotiated video capability to be QCIF ignoring a preferred capability specified by the receiving client as VGA or CIF.

Figure 3:
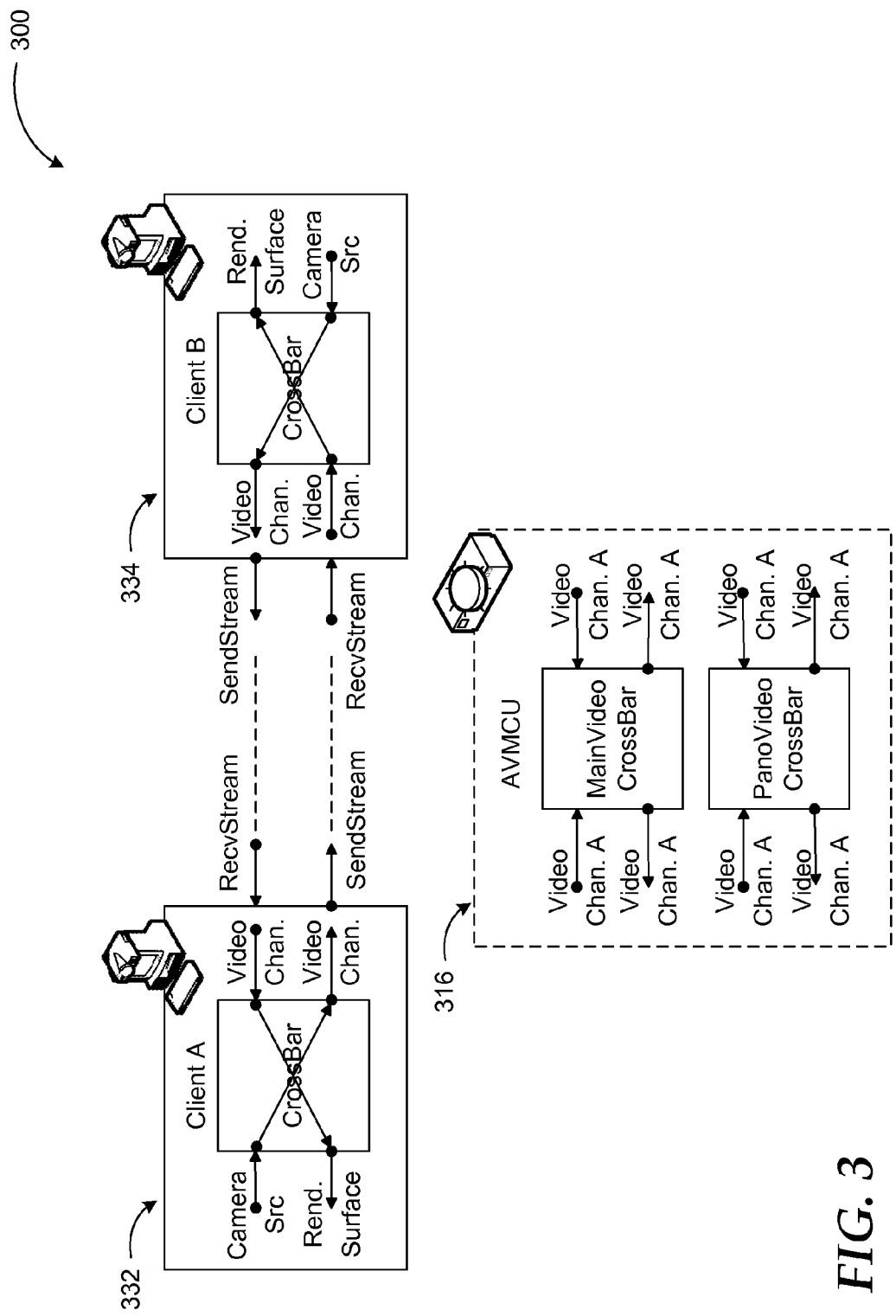
FIG. 3 illustrates example crossbar structures of two video conference clients exchanging video streams and the crossbar structure of an MCU for facilitating a video conference with a main video channel and a panoramic video channel.

FIG. 3 illustrates example crossbar structures of two video conference clients exchanging video streams and the crossbar structure of an MCU for facilitating a video conference with a main video channel and a panoramic video channel.

In diagram 300, clients A and B (332 and 334) are shown with their crossbar structures for forwarding video streams. In client A, camera source (Camera Src) connects camera hardware through the crossbar to a video channel for the send stream, while rendering surface (Rend. Surface) connects through the same structure to the video channel for receive stream. In a client-to-client connection, the second client, Client B, is structured as mirror image of client A with the send stream of client A becoming the receive stream of client B and vice versa. Frames captured from Camera Src are routed and encoded to video channel output and sent to the other client. Similarly, encoded frames received on video channel input are routed, decoded, and displayed onto the rendering surface.

Audio Video Multipoint Control Unit (AVMCU) 316 is shown with two example crossbar structures, one for the main video channel and one for the panoramic video channel. AVMCU 316 may include a routing table for determining which inputs are to be coupled to which outputs. Of course, the example structures shown in the figure are for illustration purposes and do not constitute limitations on the embodiments. A client and an MCU according to embodiments may be structured differently and accommodate additional or fewer video streams.

Figure 4:
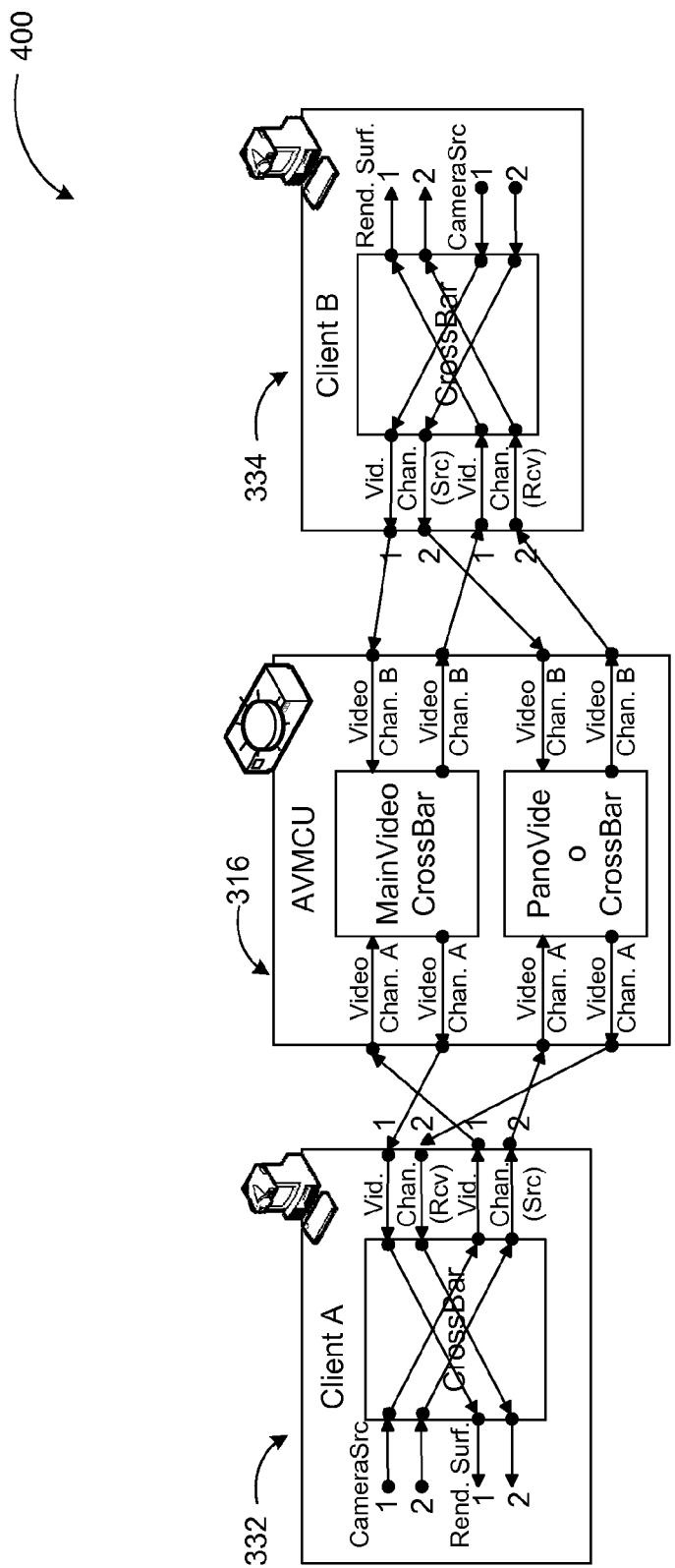
FIG. 4 illustrates the example MCU and clients of FIG. 3 with media exchange between the clients being coordinated by the MCU.

FIG. 4 illustrates the example MCU and clients of FIG. 3 with media exchange between the clients being coordinated by the MCU. In diagram 400, the clients 332 and 334 of FIG. 3 are shown in connection with the MCU 316 configured for main video and panoramic video channels. Thus, the crossbar structures of the clients for encoding/decoding and routing the transmitted and received signals are configured to handle both video streams.

As discussed above, the crossbar structure representing the client machines' internal hardware (and software) may determine through its attributes and characteristics (in addition to other device characteristics such as camera resolution) the video send (and receive) capabilities for each stream. According to one embodiment, a desired number of streams may also be considered in determining the video send and receive capabilities (and thereby the negotiated video capability). For example, requiring a main video and a panoramic video stream to be available as in the figure may result in the resolutions for both streams to be negotiated to a lower type due to limitations on the client devices. Some devices may not be able to handle the highest resolution for any number of streams.

Figure 5:
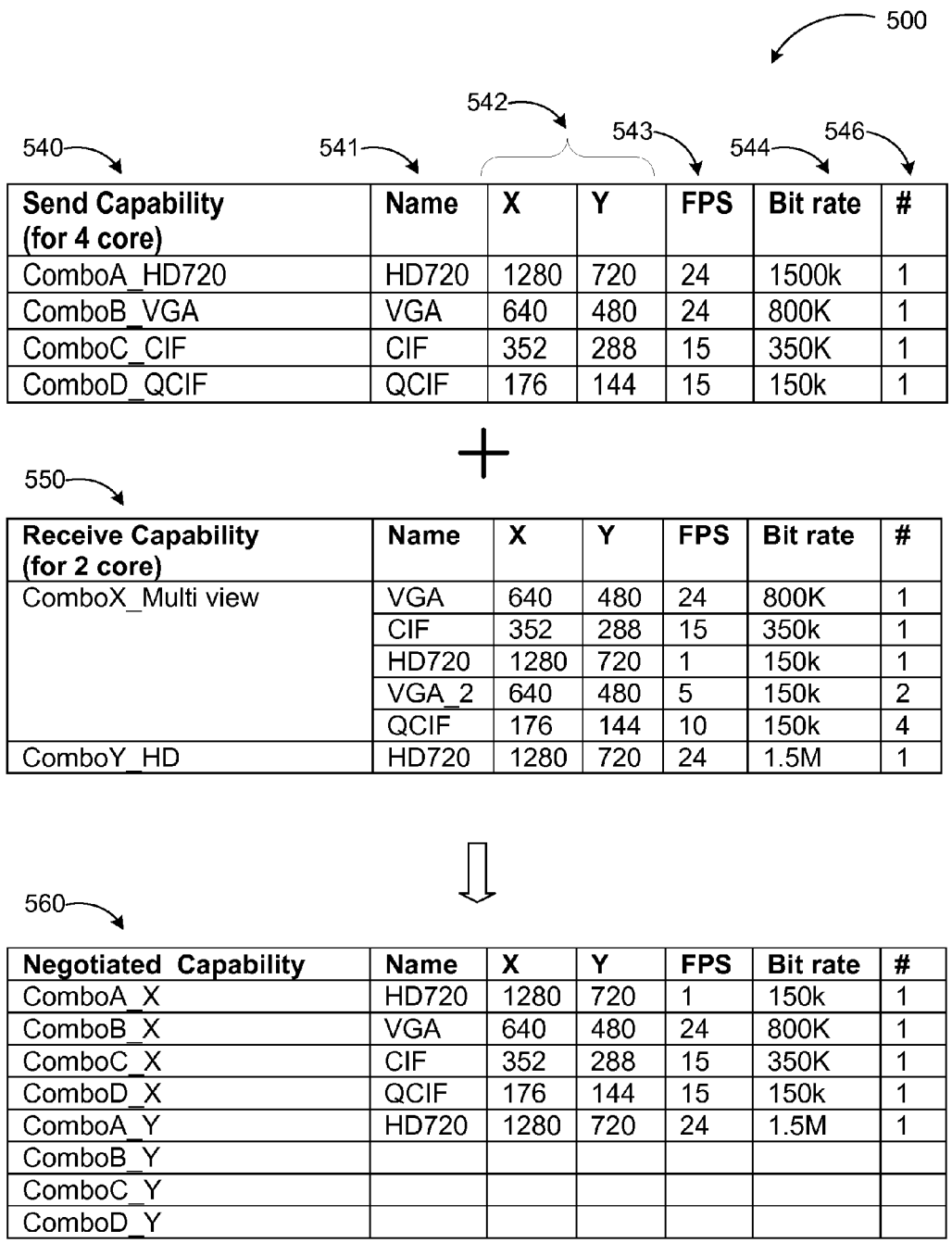
FIG. 5 illustrates derivation of an example negotiated capabilities table from a combination of a send capabilities table and a receive capabilities table.

FIG. 5 illustrates derivation of an example negotiated capabilities table from a combination of a send capabilities table and a receive capabilities table. As discussed above, the video capabilities may be stored as tables with the rows indicating video stream combinations.

In diagram 500, the first table 540 includes video send capabilities for a four core client device. The first column is the combination description, the second column (541) is the name of the capability (resolution), the third column (542) is the number of pixels along the x-axis and y-axis defining the resolution, the fourth column 543 is the frame rate per second, the fifth column 544 is the bit rate, and the sixth column 546 is the number of streams that can be provided for this resolution type. For example, combination "ComboD_QCIF" can provide a single QCIF stream with a 176*144 resolution with 15 frames per second at 150 kbits/sec rate.

Second table 550 includes, in the same format, the combinations for a two core client device's video receive capabilities as combinations. For example, the device may receive a single HD720 format video stream in "ComboY_HD" combination, while it can receive the listed combinations and numbers of streams for the "ComboX_Multi view" combination.

When the send and receive capabilities are combined through an intersection logic formula (which may be according to one embodiment a "lesser of the two" combination), the resulting negotiated video capability table (560) includes the listed combinations, which are the single stream resolutions under the multi view combination (number of streams reduced) and a single HD resolution stream under the single view combination. The receiving client can then select from these capabilities, which one it wants to actually receive. As shown in table 560, the combinations of the high resolution "ComboY_HD" receive capability and the send capabilities are empty, because those do not intersect according to the formula used by the system to determine negotiated capabilities as described in conjunction with FIG. 2. In other words, the system (or in a specific implementation, the source client) may compare each send combination with receive combination, and if the send capability exists in the receive capabilities, use the highest frame rate and/or bit rate.

Figure 6:
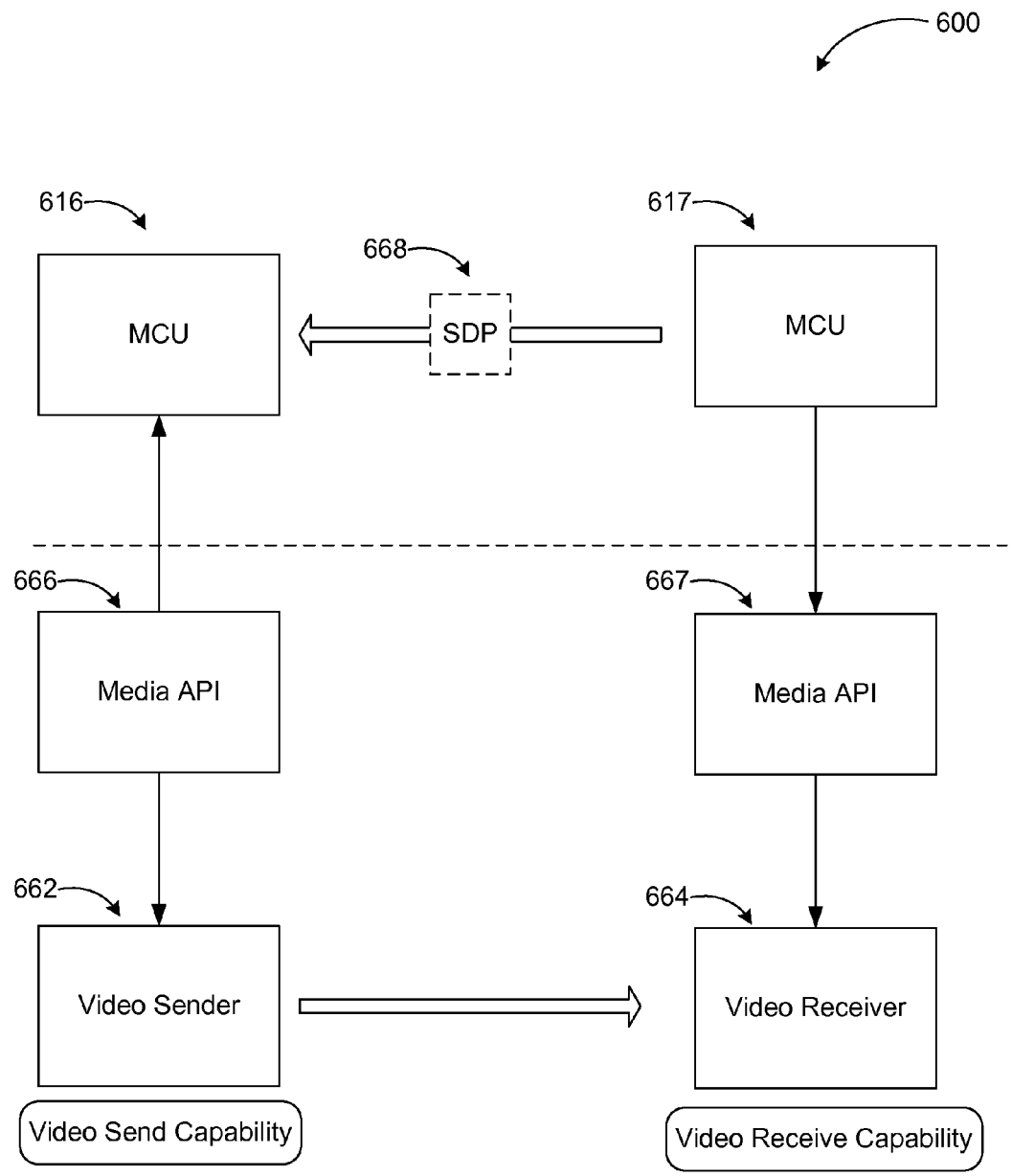
FIG. 6 illustrates a diagram of resolution negotiation flow between the components of a video conference system according to embodiments.

FIG. 6 illustrates a diagram of resolution negotiation flow between the components of a video conference system according to embodiments. According to the example negotiation flow shown in diagram 600, video sender 662 begins with determining its own video send capabilities. On the receive side, video receiver 664 determines its video receive capabilities, which are queried by MCU 617 through media API 667. If multiple MCUs are used, MCU 617 may provide video receive capabilities from video receiver 664 to MCU 616 using SDP, which reconstructs the video receive capabilities and updates video sender through media API 666. Video sender 662 computes negotiated video capabilities and determines which video stream are to be transmitted. Those streams are then sent to video receiver 664, which may validate the incoming streams.

Following are a couple of example scenarios: user A has a VGA/CIF/QCIF capable machine (Dual Core+CPU, VGA camera), and its policy allows for VGA/CIF/QCIF combination. User A sends a video invite to user B, who accepts the invite. If both machines are capable of (and allowed to have) VGA/CIF/QCIF, then user A starts to send a video stream that is either VGA or CIF or QCIF, defaulting to the higher resolution. On the other hand, user B may prefer to receive a specific resolution and send an update to user A specifying the preferred resolution. User A may attempt to accommodate the request. However, user A can do this only within the boundaries of the initially negotiated capability. If for any reason, the initial negotiated capability is not valid anymore (due to third party application running, etc.), user B or user A might send a SIP re-invite message to renegotiate the capability from the beginning.

User A running on a Quad Core machine with HD camera may be capable of sending HD/VGA/CIF/QCIF. If user B's machine is capable of HD/VGA/CIF/QCIF decoding, then user A may send either of the HD/VGA/CIF/QCIF video stream, defaulting at HD.

The above described algorithms, capabilities, and parameters are for example purposes and do not constitute a limitation on embodiments. Video conferencing with negotiated send and receive video capabilities may be implemented and negotiated capabilities computed through additional or fewer steps, capabilities, and components using the principles described herein.

Figure 7:
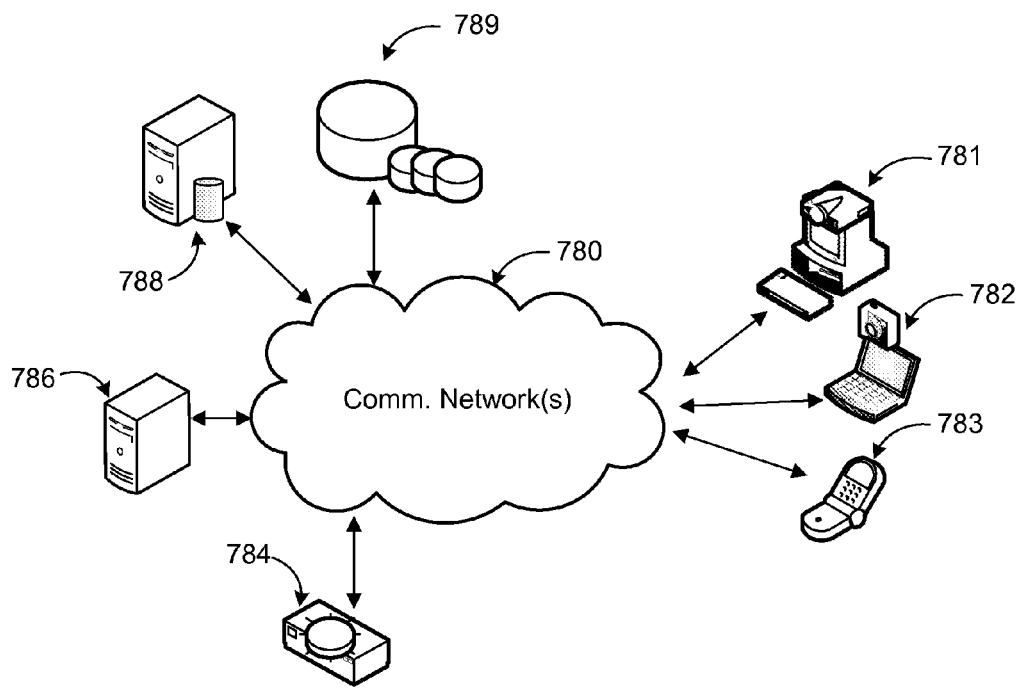
FIG. 7 illustrates a networked environment where embodiments may be implemented.

FIG. 7 is an example networked environment, where embodiments may be implemented. Multiple video stream capability negotiation as described previously may be implemented locally or in a distributed manner over a number of physical and virtual clients and servers. Such a system may typically involve one or more networks such as communication network(s) 780. The conference may also be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device associated with a participant of the video conference. While a system according to embodiments may involve many more components, typical and relevant ones are discussed in conjunction with this figure.

Video conference with capability negotiation may be facilitated by MCU 784 alone or in conjunction with server 786. Server 786 may provide complementary services such as storing and processing audio/video data. Data associated with the video conference (e.g. displayed documents, participant addresses, etc.) may be stored in one or more data stores such as data stores 789, which may be directly accessed by the servers and/or clients of the system or managed through a database server 788. Communication network(s) 780 provides the backbone of the video conference system and may employ a number of protocols such as SIP, RTP, SDP, and the like. Client devices (e.g. 781-783) provide platforms for participants to transmit and receive audio/video and other signals. Users may access the conference system using a client device or one or more client applications running on a client device.

Communication network(s) 780 provides communication between the nodes described herein. By way of example, and not limitation, communication network(s) 780 may include wired media such as a wired network or direct-wired connection, and wireless media such as acoustic, RF, infrared and other wireless media.

Many other configurations of computing devices, applications, data sources, data distribution systems may be employed to implement a video conferencing system with capability negotiation. Furthermore, the networked environments discussed in FIG. 7 are for illustration purposes only. Embodiments are not limited to the example applications, modules, or processes.

Figure 8:
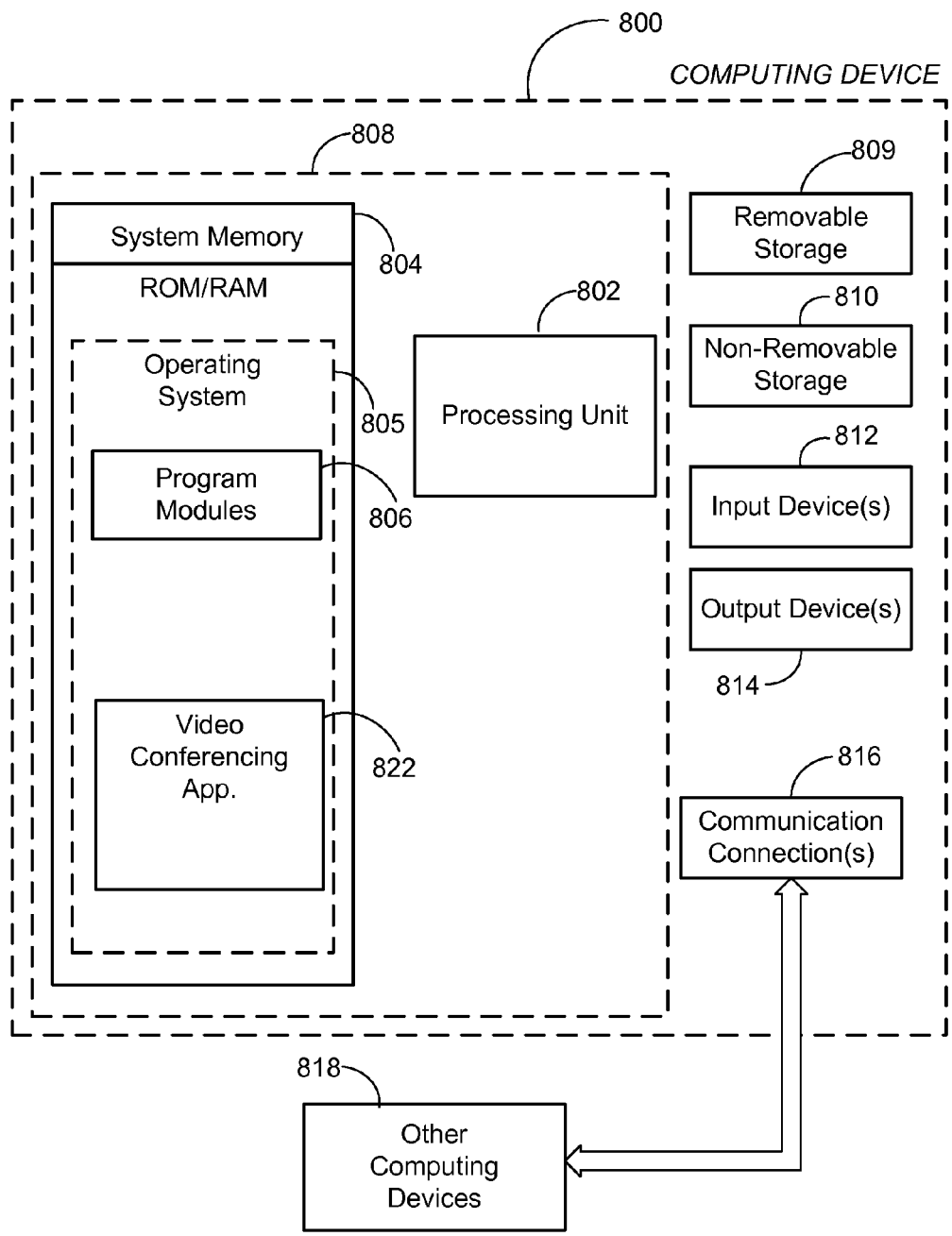
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment is illustrated, such as computing device 800. In a basic configuration, the computing device 800 may be a client device in sender role in a video conference or a server executing programs associated with the functionality of an MCU for facilitating a video conference. Computing device 800 may typically include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the computing device, such as the WINDOWS® operating systems from MICROSOFT CORPORATION of Redmond, Wash. The system memory 804 may also include one or more software applications such as program modules 806 and video conferencing application 822.

Video conferencing application 822 may be a separate application or an integral module of a hosted service application that provides advanced communication services through computing device 800, as described previously. This basic configuration is illustrated in FIG. 8 by those components within dashed line 808.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

The computing device 800 may also contain communication connections 816 that allow the device to communicate with other computing devices 818, such as over a wireless network in a distributed computing environment, for example, an intranet or the Internet. Other computing devices 818 may include client devices and servers of the communications network defined above. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
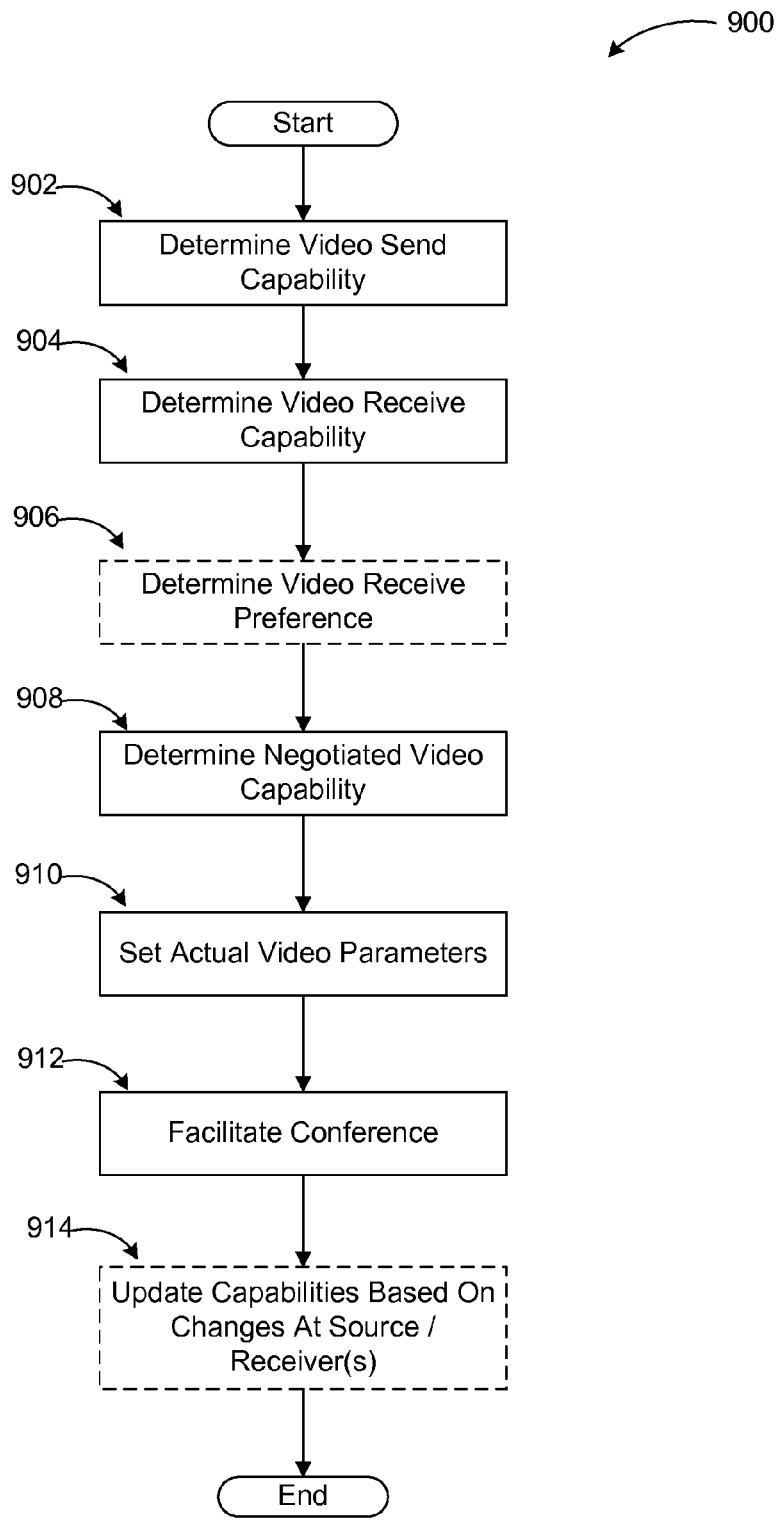
FIG. 9 illustrates a logic flow diagram for a process of facilitating a multi-stream video conference with capability negotiation according to embodiments.

FIG. 9 illustrates a logic flow diagram for process 900 of facilitating a video conference with send and receive capabilities negotiation according to embodiments. Process 900 may be implemented in a client device in sender role or an MCU device facilitating video conferencing.

Process 900 begins with operation 902, where a sender's video send capabilities are determined These may be determined based on sender's processing capacity, memory size, currently active programs and/or video applications (consuming processing and memory capacity), encoding capacity, and uplink bandwidth, among other attributes. Processing moves from operation 902 to operation 904.

At operation 904, receiving client's video receive capabilities are determined based on similar factors and provide to the sender or the MCU for subsequent computation of negotiated capabilities. Processing advances from operation 904 to optional operation 906, where the receiving client's receive preferences are determined These may be based on factors such as display window size, sharpness of image, frame rate, and so on. The receive preferences are also forwarded to the sender or the MCU.

At next operation 908, the negotiated video capabilities are determined based on a comparison and combination of the receive and send capabilities, for example applying the formula discussed above in conjunction with FIG. 2. Processing moves from operation 908 to operation 910.

At operation 910, the actual video parameters are set based on the negotiated video capabilities and the receiving client's preferences (or selections). Processing then advances to operation 912, where the video conference is facilitated using the negotiated video capabilities. Optionally, operation 912 may be followed by operation 914, where the capabilities are updated based on changes at the source or receiving clients such as more/less capacity becoming available, one client dropping out of the conference, and so on.

The operations included in process 900 are for illustration purposes. Negotiating video send and receive capabilities for multiple streams may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system configured to:
   use video receive capabilities that comprise supported video stream combinations and video preferences as part of providing video conferencing functionality;
   determine negotiated video capabilities based in part on video send capabilities and the receive video capabilities, the video send capabilities comprising supported video streams;
   determine video stream combinations based in part on the video send capabilities and the video receive capabilities and use existing video stream combinations based in part on one or more of a bit rate parameter and a frame rate parameter; and
   use a video stream defined by the video preferences if receiver video preferences are equal or less to determined negotiated video capabilities, otherwise provide a video stream combination defined by the determined negotiated video capabilities.

2. The system of claim 1, further configured to use video preferences for each video stream and provide the video preferences for facilitating the video conference if the video preferences match the determined negotiated capabilities.

3. The system of claim 1, further configured to select a lower one of the frame rates of the video stream combinations that exist in both the video receive capabilities and video send capabilities.

4. The system of claim 3, further configured to select a lower one of the bit rates of the video stream combinations that exist in in both the video receive capabilities and video send capabilities.

5. The system of claim 1, further configured to provide video conferences using audio, video, instant messaging, application sharing, and data sharing communications.

6. The system of claim 1, further configured to determine video receive capabilities based on one or more of receiver processing capacity, available memory, a display resolution, decoding capabilities, and a downlink bandwidth.

7. The system of claim 1, further configured determine the video send capabilities based on one or more of sender processing capacity, available memory, camera resolution, encoding capabilities, and an uplink bandwidth.

8. The system of claim 1, further configured to determine the video preferences based in part on a display window size, an image sharpness, and a frame rate.

9. The system of claim 1, further configured to discover sender and recipient capabilities and preferences to determine negotiated conferencing capabilities and stream combinations.

10. The system of claim 9, further configured to determine the negotiated conferencing capabilities such that $X_S=X_R$ and $Y_S=Y_R$ and $FPS_R>=FPS_S$ and $BR_R>=BR_S$, where X and Y denote a video resolution of a display along horizontal and vertical dimensions, respectively, FPS denotes frame rate, BR denotes bit rate, and the subscripts S and R denote send and receive, respectively.

11. The system of claim 1, further configured to determine negotiated conferencing capabilities using a client device acting as the sender and a control unit to facilitate a video conference.

12. The system of claim 1, further configured to dynamically adjust negotiated conferencing capabilities in response to a change of a number of conference participants or video processing capabilities.

13. The system of claim 1, further configured to determine the video preferences based on dynamic choices made by a video conference device.

14. A method comprising:
using a set of video send capabilities and a set of video receive capabilities comprising video stream combinations as part of providing video conferencing functionality, wherein each video stream combination includes at least one video stream type;
using negotiated video capabilities based on a comparison of the set of video send capabilities and the video receive capabilities;
using video stream combinations that exist on both sets based on one or more of a bit rate and a frame rate; and
using video streams defined by receiver video preferences if the receiver video preferences are equal or less to the negotiated video capabilities, otherwise provide a video stream combination defined by a negotiated video capability for each participant device.

15. The method of claim 14, further comprising adjusting the negotiated video capabilities based on a number of video conference participants and available video transmit bandwidth.

16. The method of claim 14, further comprising using the video send capabilities and the video receive capabilities based in part on a defined configuration for managing video conference parameters.

17. The method of claim 14, further comprising discovering conferencing capabilities and preferences to determine negotiated conferencing capabilities.

18. A method comprising:
maintaining video send capability information comprising supported video stream combinations;
using video receive capability information comprising video stream combinations supported by each participant device;
comparing the video receive capability information with the video send capability information; and
determining negotiated video capabilities by using a video stream combination such that $X_S=X_R$ and $Y_S=Y_R$ and $FPS_R>=FPS_S$ and $BR_R>=BR_S$, where X and Y denote x and y axes pixel numbers of a display for defining the resolution, FPS denotes the frame rate, BR denotes the bit rate, and the subscripts S and R denote "send" and "receive", respectively.

19. The method of claim 18, further comprising using a different video stream combination in response to a change in network bandwidth conditions or some other communication parameter.

20. The method of claim 18, further comprising simultaneously providing video streams for a main video channel and a panoramic video channel.

* * * * *